(12) United States Patent
Brandenberger

(10) Patent No.: US 6,587,548 B2
(45) Date of Patent: Jul. 1, 2003

(54) METHOD AND SYSTEM OF USING A SINGLE TELEPHONE NUMBER FOR MULTIPLE SERVICES

(75) Inventor: Sarah M. Brandenberger, Boise, ID (US)

(73) Assignee: Hewlett-Packard Development Co., L.P., Houston, TX (US)

( * ) Notice: Subject to any disclaimer, the term of this patent is extended or adjusted under 35 U.S.C. 154(b) by 185 days.

(21) Appl. No.: 09/908,262

(22) Filed: Jul. 17, 2001

(65) Prior Publication Data
US 2003/0016795 A1 Jan. 23, 2003

(51) Int. Cl.⁷ .............................................. H04M 11/00
(52) U.S. Cl. ................. 379/93.11; 379/100.15; 379/142.07; 379/199; 379/93.09
(58) Field of Search ................ 379/93.09, 93.11, 379/93.01, 93.05–93.07, 100.15, 100.16, 102.01, 102.02, 199, 201.01, 142.01, 142.04, 142.05, 142.07

(56) References Cited

U.S. PATENT DOCUMENTS

| | | | | |
|---|---|---|---|---|
| 5,544,229 A | * | 8/1996 | Creswell et al. | 379/100.16 |
| 5,625,680 A | * | 4/1997 | Foladare et al. | 379/199 |
| 5,726,767 A | | 3/1998 | Kumakura et al. | |
| 5,904,013 A | | 5/1999 | Greenspan et al. | |
| 6,298,122 B1 | * | 10/2001 | Horne | 379/93.09 |
| 6,389,117 B1 | | 5/2002 | Gross et al. | |
| 6,442,249 B1 | * | 8/2002 | Miller, Jr. | 379/93.09 |

FOREIGN PATENT DOCUMENTS

| | | |
|---|---|---|
| WO | WO9111874 | 8/1991 |
| WO | WO9526091 | 9/1995 |
| WO | WO9812882 | 3/1998 |
| WO | WO0078017 | 12/2000 |

* cited by examiner

Primary Examiner—Wing Chan

(57) ABSTRACT

A system is provided for connecting received calls, which may be voice or data calls having a common destination identifier associating the calls with a subscriber, to a selected at least one of one or more call options assigned to the subscriber. In one embodiment, the system includes a call detector, a voice call decoder, and a data call decoder. The call detector has an input for receiving the calls. It also has a first output and a second output. The detector provides a received call to the first output if it is a voice call and provides it to the second output if it is a data call. The voice call decoder has an input operably connected to the first output of the call detector for receiving the voice calls. It also has one or more outputs operably accessible to one or more voice call options for connecting the voice calls each to a selected at least one of the one or more voice call options. Likewise, the data call decoder has an input operably connected to the second output of the call detector for receiving the data calls. The data call decoder also has one or more outputs operably accessible to one or more data call options for connecting the data calls each to a selected at least one of the one or more data call options.

20 Claims, 3 Drawing Sheets

METHOD AND SYSTEM OF USING A SINGLE TELEPHONE NUMBER FOR MULTIPLE SERVICES

TECHNICAL FIELD

The present invention relates generally to telecommunications systems and in particular, to a method and system for using a single number for multiple call destination options.

BACKGROUND

The use of multiple lines by telephone subscribers is now commonplace. The lines are used not only for voice call options (e.g., conventional telephone, wireless phones, answering services), but also, for data call options such as facsimile devices and pagers. In addition to lines within the household, subscribers frequently rely on cellular lines, lines in office locations, lines at locations near the home, and lines at relatives' or friends' homes. Even more common is the use of multiple lines by businesses.

Typically, a separate destination identifier (or number) is used for each separate line/call option. Thus, a given subscriber may have multiple numbers associated with its various voice and data call options. This can be highly inconvenient to a subscriber especially in the context of an initial encounter with another person to whom the subscriber wishes to make himself/herself available. In order to provide the person with access to all of the subscriber's call options, each number must be separately conveyed to the person. Unfortunately, this may be necessary in order to provide the person with a reasonable opportunity to connect with the subscriber who may at any given time be at home, at the office, or in the car.

Accordingly, it would be desirable to have a method and system for providing a subscriber with a single number that can be used for his/her various call options.

SUMMARY OF THE INVENTION

The present invention is directed to a system and method which provides a system for connecting received calls, which may be voice or data calls having a common destination identifier associating the calls with a subscriber, to a selected at least one of a plurality of call options assigned to the subscriber. In one embodiment, the system includes a call detector, a voice call decoder, and a data call decoder. The call detector has an input for receiving the calls and a number of outputs. The detector provides a received call to one output if it is a voice call and provides it to another output if it is a data call. The voice call decoder has an input operably connected to one or more voice outputs of the call detector for receiving the voice calls. Likewise, the data call decoder has an input operably connected to one or more data outputs of the call detector for receiving the data calls.

DETAILED DESCRIPTION

Figure 1:
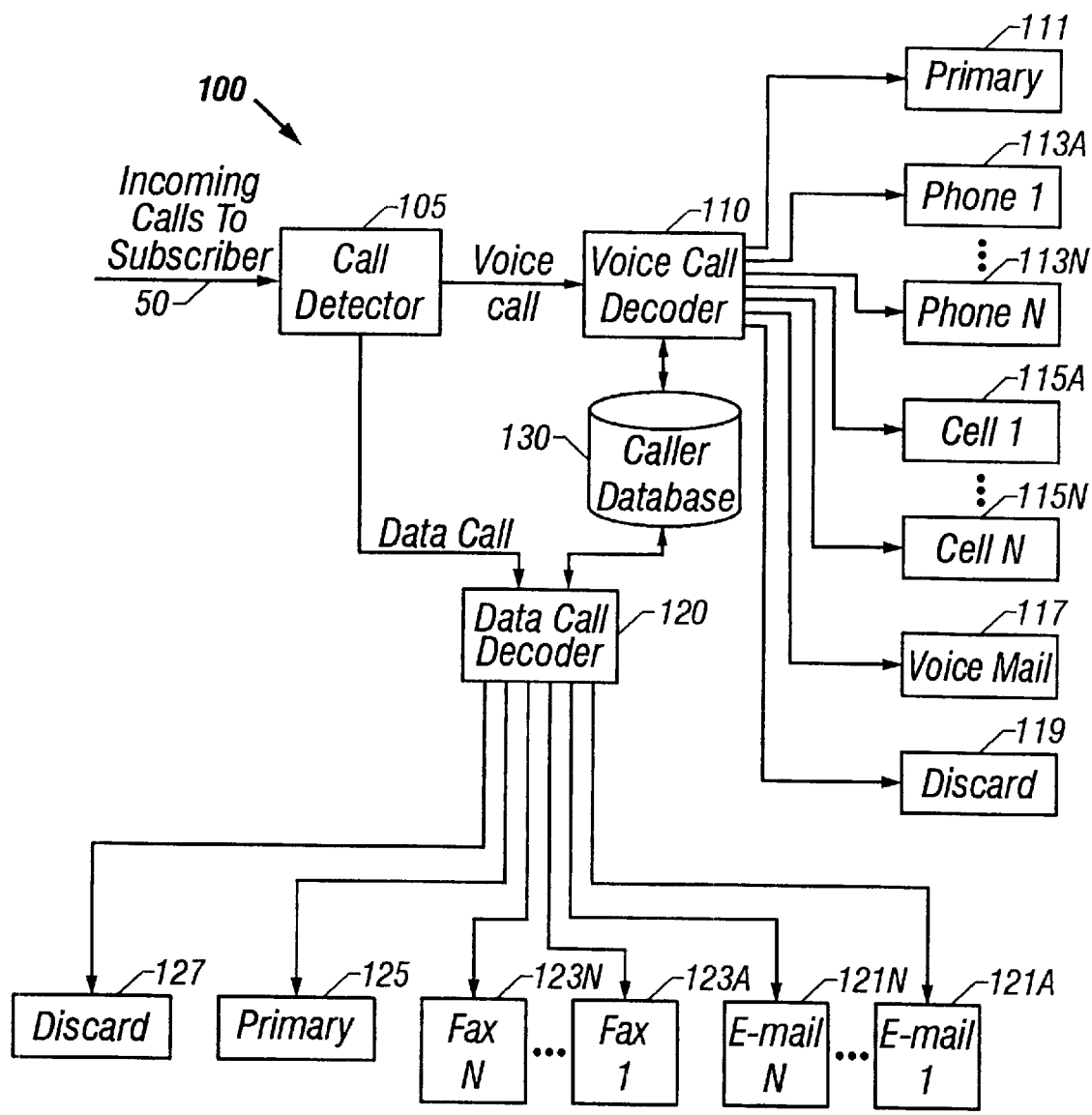
FIG. 1 is a block diagram of a single number call connection system of the present invention.

FIG. 1 shows one embodiment of single number, multiple service processing system 100 of the present invention. System 100 generally comprises call detector 105, voice call decoder 110, voice line options 111–119, data call decoder 120, data line options 121–127, and caller database 130. The voice line options include primary voice line option 111, conventional telephone line options 113A–113N, cellular options 115A–115N, voice mail option 117 and discard option 119. Likewise, the depicted data line options include e-mail options 121A–121N, facsimile options 123A–123N, primary data line option 125, and discard option 127.

Call detector 105 has an input for receiving incoming calls 50, which are associated with a particular telephone number, e.g., a single number assigned to a subscriber. Incoming calls 50 can be either voice or data calls. A voice call is any call signal from a caller that is intending to communicate with the subscriber. It may be digital or analog, and it normally is sent from a caller attempting to connect to the subscriber for a real-time audio conversation. A voice call could come from any appropriate source including but not limited to a wire-connected telephone, a wireless telephone such as a cellular phone, a computer generated voice transmission, a simultaneous voice and data ("SVD") device, or a telephone appliance via the Internet. A data call, on the other hand, is any other call that includes data intended to be stored and/or transformed onto a media for access by the subscriber. Examples of data calls include but are not limited to facsimile and pager calls. Detector 105 additionally has a first output communicatively connected to an input of voice signal decoder 110 for routing to it the incoming voice calls and a second output communicatively connected to an input of data signal decoder 120 for routing to it the incoming data calls. In turn, voice call decoder 110 has one or more outputs connected to various voice line options 111–119 for selectively connecting an incoming voice call with one or more of the voice call options based on a call selection algorithm performed by voice call decoder 110. Similarly, data call decoder 120 has one or more outputs connected to various data line options 121–127 for selectively connecting an incoming data call to one of the data call options based on a call selection algorithm performed by data call decoder 120. Call selection algorithms for voice and data call decoders 110, 120 will be addressed in greater detail below.

System 100 may be implemented in any suitable environment such as a central office, a company's private branch exchange ("PBX"), or in a subscriber's home (e.g., via a home computer). Depending on the particular environment, call detector 105, voice call decoder 110, data call decoder 120, and caller database 130 may be designed with any suitable configuration and combination of hardware and software components. For example, call decoders 110, 120 will at least have processors and memory for executing the utilized call selection routines (algorithms) and can, if desired, by a single unit (not shown).

Call detector 105 receives incoming calls and determines whether they are voice or data calls. It directs the voice calls to voice call decoder 110 and directs the data calls to data call decoder 120. Any appropriate scheme known to persons of ordinary skill in the art can be used for determining (or identifying) whether the call is a voice or data call. For example, the methods and systems taught by U.S. Pat. No. 5,726,767, entitled "AUTOMATIC FACSIMILE SIGNAL ANALYZING APPARATUS FOR A TELEPHONE EXCHANGE SYSTEM" issued to Kumakura et al. Mar. 10, 1998, the disclosure of which is hereby incorporated herein by reference.

Voice and data call decoders 110, 120 connect incoming calls to their respective voice and data options based on the executed call selection algorithms and pre-selected subscriber designations. Primary voice option 111 corresponds to one of the other voiced options 113–119, as designated by the subscriber. Primary option 111 can be changed (e.g., over the phone) by the subscriber and it can change depending upon such parameters as the date and time. It typically will be associated with the telephone option that is conveniently and presently accessible to the subscriber. Phone options 113A–113N correspond to one or more conventional wired telephones assigned to the subscriber. They could correspond to residential, business or other telephones. Similarly, cell options 115A–115N comprise one or more cellular (or other wireless) telephone options assigned to the subscriber. Voice mail option 117 corresponds to a conventional voice mail device for recording a voice message from a caller, and discard option 119 comprises circuitry for terminating the call. For example, when this option is selected by voice call decoder 110, discard circuitry 119 could transmit to the caller a polite termination message and "hang up" with an appropriate off/on hook sequence. Data options 121–127 are similar to those for voice calls, except that they comprise appropriate devices for receiving, storing and, if necessary, transforming data information from the call onto a selected one of the data call options. E-mail options 121A–121N correspond to e-mail server locations assigned or accessible to the subscriber. Facsimile options 123A–123N correspond to one or more conventional facsimile devices (e.g., machine, computer-implemented) available to the subscriber. Primary option 125 is selected by the subscriber from any of the other data options as the subscriber's primary data option. As with the voice discard option, data discard option 127 causes the data call to be terminated without conveying its transmitted data to the subscriber. In addition, call detector 105 includes conventional format conversion processors for converting a data call into an appropriate format based on the selected option. For example, an incoming facsimile call could be transformed into an e-mail format and directed to a selected e-mail address for the subscriber.

Caller database 130 is a conventional database/database application for storing and processing call source identifiers associated with caller priority information, as specified by a subscriber. The call selection routines, which are executed by voice and data call decoders 110, 120 will use this database if a call is identifiable in determining how it is to be acted upon, as specified (either directly or indirectly) by the subscriber. Database 130 can be implemented with any suitable database scheme including, but not limited to, flat-file, hierarchical, relational, and object-oriented databases.

Figure 2:
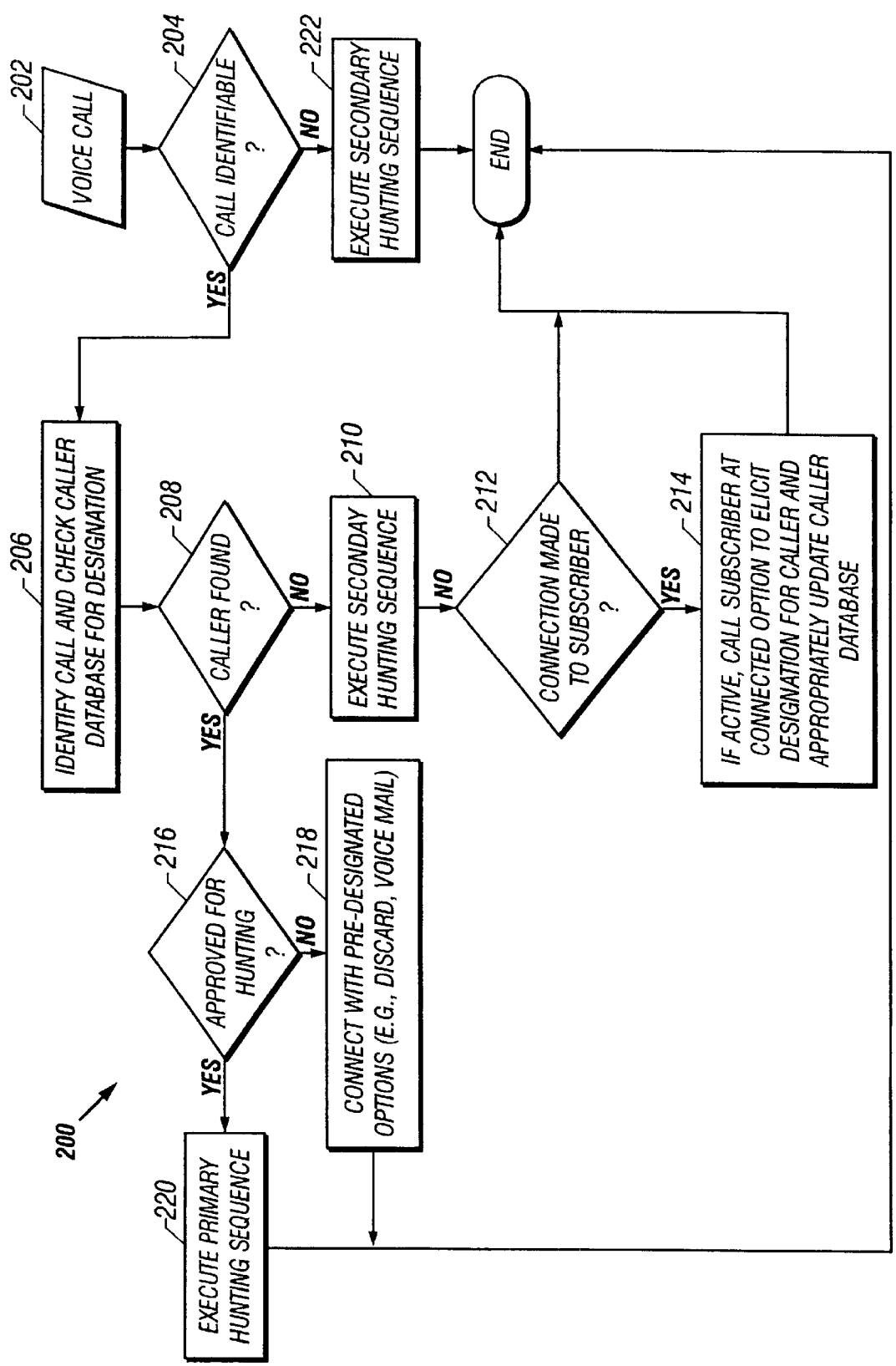
FIG. 2 is a flow chart of a routine for implementing a voice call selection routine of the present invention.

FIG. 2 shows one embodiment of portion 200 of a routine for implementing a voice call selection algorithm, which may be utilized by voice call decoder 110. When voice call 202 is received (at voice call decoder 110), the routine initially determines whether it is identifiable, e.g., via conventional caller identification methods, at 204. If the call is identifiable, then at step 206, the routine identifies the caller and checks a caller database for an associated priority designation. In one embodiment, it also logs the identifier in the database in order to later provide to the subscriber a log of the received, identified calls. At step 208, it is determined whether a caller was found in the caller database. If a caller was found then at step 216, it is determined whether the particular caller is approved for hunting. If the caller is in fact approved for hunting, then at step 220, the routine executes a primary hunting sequence. A primary hunting sequence involves connecting the caller with one or more of the voice (or data) call options based on predefined criterion from the subscriber. Typically, the primary hunting sequence will begin with primary voice call option 111 (e.g., primary cell phone) and proceed through one or more other voice call options depending upon the particular hunting sequence being implemented. If the subscriber is not "found" by the hunting sequence, it may end with voice mail option 117, or alternatively, it may end by connecting the caller to a data option such as an e-mail or pager option with the use of a suitable voice-to-data converter. In addition, the hunting sequence could dynamically select one of several options based on encountered real-time circumstances. For example, if a busy signal is detected, the sequence could direct the caller to a storage option such as voice mail, e-mail or a pager option. Similarly, if the caller has a sufficiently high priority designation, the caller itself could select one of several available options (pager, voice mail) if the subscriber is not reached. It should be recognized, however, that any suitable hunting sequence such as conventional sequences may be used. For example, U.S. Pat. No. 5,904,013, entitled "OVERLAPPED ALERTING IN WIDE AREA CALL FORWARDING" issued to Greenspan et al. May 18, 1999, the disclosure of which is hereby incorporated herein by reference, teaches methods for implementing suitable hunting sequences.

Once the primary hunting sequence has been initiated at step 220, the routine ends from here with the caller being connected to one or more of the voice (or data) call options depending upon the utilized hunting sequence and availability of the subscriber.

If at step 216, it is determined that the identified caller is not approved for hunting, then the routine proceeds to step 218 and connects the caller to a the pre-designated voice (or data) call option (e.g., discard or voice mail) as specified in caller database 130. This corresponds to a caller previously identified by the subscriber as having an insufficiently low priority such that it is not to be connected—at least in real time—with the subscriber. However, at step 208, if the identified caller was not found in the caller database, then the routine proceeds to step 210 where it executes a secondary hunting sequence. As with a primary hunting sequence, a secondary hunting sequence may be implemented with any suitable conventional hunting scheme. Typically, it will be defined—at least to some degree—by the subscriber. For example, the subscriber could define a scheme that checks on several voice (or data) call options in an attempt to actually find the subscriber, or it could involve simply directing the call to a single predefined option such as discard, voice mail, e-mail or pager. At step 212, the routine then determines whether a real time connection was actually made between the caller and the subscriber. If a connection was made and if enabled by the subscriber, the system attempts to contact the subscriber and elicit from it a designation to be associated with the caller that has just connected with the subscriber. If such a designation is received from the subscriber, the system appropriately updates and enters it into the caller database. The routine ends once this is completed. On the other hand, if a connection is not made, the routine ends, unless, for example, a busy signal was encountered (i.e., the subscriber was located but not reached). Then, the routine could attempt to call the subscriber and update the priority database for the caller.

At step 204, if the call was not identifiable, then the routine proceeds to step 222 and executes the secondary hunting sequence. This may or may not be the same secondary hunting sequence as specified at step 210. However, as is the case at step 210, it corresponds to a call from an anonymous caller. Accordingly, a relatively unintrusive secondary hunting sequence will normally be used. From here, the routine typically ends after the secondary hunting sequence has been executed.

Figure 3:
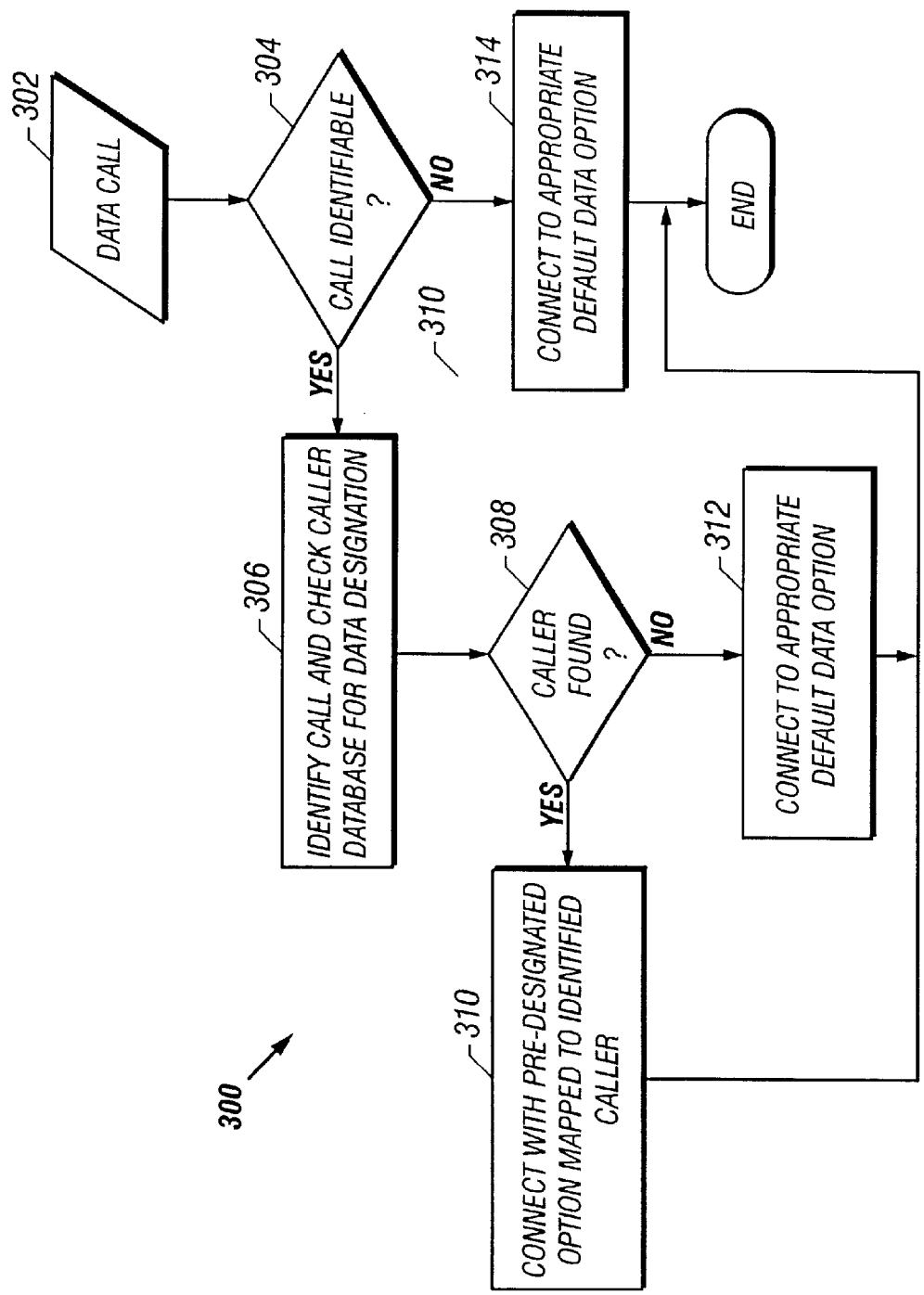
FIG. 3 is a flow chart of a routine for implementing a data call selection routine of the present invention.

FIG. 3 shows one embodiment of portion 300 of a call selection routine, which may be implemented as a data call routine for data call decoder 120 of the present invention. Initially, when data call 302 is received at data call decoder 120, the routine determines whether the call is identifiable at step 304. If it is identifiable, then at step 306, it identifies the call and checks the caller database for an associated designation (e.g. preassigned by the subscriber) that is mapped to the data call. As with an incoming voice call, it may also log the call for later providing the subscriber with a log of all identifiable incoming calls. From here, the routine proceeds to step 308 and determines whether the identified data caller was located in the database. If the caller was found, then at step 310, the routine connects the data call to the predesignated data option that is mapped to the caller within the database. For example, specific facsimile calls could be directed to separate facsimile options 123A–N (e.g., home, work, car), or they could be converted into an e-mail format and routed to a particular e-mail address for the subscriber—depending upon the identity of the data call source.

Conversely, at step 308 if a caller was not found, then the routine proceeds to step 312 where it connects the caller to a predesignated default data option. Typically, the subscriber will designate an appropriate default data option (e.g., discard, junk-mail account) to be used for anonymous data calls.

At step 304, if the call was not identifiable, then the routine proceeds to step 314 and again connects the call to an appropriate default data option, which of course, may be different from the default option for an identifiable but unassigned data call. From here the routine ends with the caller having been connected to one of the data options.

In order to connect calls to selected options, these algorithms can be implemented in a telecommunications network using methods similar to standard call forwarding. In particular, the algorithm can be programmed into any commercially available switch which is capable of manipulating independent legs of a telephone call. In this case, the program implementing the algorithm would reside on the subscriber's switch at the local exchange. A dedicated register is uniquely associated with the local switch and the subscriber's primary line. This register is used when the subscriber wishes to forward his calls to another destination as in typical call-forwarding applications. Decoders 110, 120 could load the number (or address) of the selected call option into this register and initiate a forwarding operation in order to connect the call to the selected option. Advantageously, this type of switch-programming provides wide area capability; that is, a subscriber is not limited to forwarding his or her calls only to dedicated terminals but may instead forward the calls to any destination accessible by the Public Switched telephone Network ("PSTN").

Alternatively, the algorithms could be implemented by programming an adjunct, which is typically connected to the subscriber's switch via a BRI for coordinating switching. One example of a commercially utilized adjunct is AINet. In the call-forwarding scenario, the adjunct essentially functions by redirecting calls from an originating switch to a forwarded destination.

Typically, this intention is established by the subscriber entering this telephone number into a call-forwarding register on the local switch or adjunct. The call forwarding register would be dynamically and variably associated with a particular selected option, as determined by call decoder 110, 120.

What is claimed is:

1. A system for connecting received calls, which may be voice or data calls, having a common destination identifier associated with a called party, to a selected at least one of a plurality of call options assigned to the subscriber, said system comprising:

a call detector having an input for receiving such a call and a plurality of outputs wherein the detector provides the call to a first output if it is a voice call and provides it to a different output if it is a data call;

a voice call decoder having an input operably connected to said first output of the call detector for receiving the call when it is a voice call, the voice call decoder also having a plurality of outputs operably accessible to one or more voice call options for connecting the voice call to a selected one of the plurality of voice call options; and a data call decoder having an input operably connected to said different output of the call detector for receiving the call if it is a data call, the data call decoder also having a plurality of outputs operably accessible to one or more data call options for connecting the data call to a selected one of the plurality of data call options.

2. The system of claim 1 further comprising a caller database for providing said voice and data decoders with caller priority information designated by said called party.

3. The system of claim 2 wherein said voice call decoder includes a processor that executes instructions for deriving from a received voice call an identifier uniquely associated with the source of the voice call and retrieving from said caller database caller priority information mapped from the derived identifier.

4. The system of claim 3 wherein said voice decoder connects the voice call to the selected voice option based on the caller priority information retrieved from the database.

5. The system of claim 4 wherein said voice decoder initiates a primary hunting sequence if the retrieved caller priority information includes a relatively high priority designation.

6. The system of claim 5 wherein said voice call options includes a primary option that maps to a preselected one of the other voice options.

7. The system of claim 6 wherein said primary voice option is dynamically definable by the subscriber.

8. The system of claim 5 wherein said voice call decoder initiates a secondary hunting sequence if the retrieved caller priority designation indicates a relatively low priority.

9. The system of claim 8 wherein said secondary hunting sequence involves discarding the call.

10. The system of claim 5 wherein said voice call decoder initiates a secondary hunting sequence if no caller priority information has been entered into the caller database for the derived identifier, wherein the called party is elicited for caller priority information for the voice call if said call was connected via the secondary hunting sequence to the called party.

11. The system of claim 1 wherein said call detector provides the call to the second output as a data call if the call includes data formatted according to a facsimile protocol.

12. A method of connecting a received call that has been detected as a voice call for a particular subscriber to a selected one of one or more voice call options associated with the subscriber, said method comprising the steps of:

identifying the source of the voice call if possible;

retrieving from a caller database caller priority information associated with the identified source of the call, said caller priority information having been at least partially defined by the subscriber; and connecting the voice call to a selected one of the one or more voice call options based on the retrieved caller priority information.

13. The method of claim 12 wherein the step of connecting the call to a selected one of the one or more voice call options includes connecting the call to one or more selected voice call options pursuant to a primary hunting sequence if the retrieved caller priority information indicates a relatively high priority.

14. The method of claim 12 wherein the step of connecting the call to a selected one of the one or more voice call options includes connecting the call to a primary voice call option as defined by the subscriber.

15. The method of claim 14 wherein the caller is connected to the selected one of the one or more voice call options pursuant to a secondary hunting sequence if no caller priority information is retrieved for the identified source.

16. The method of claim 15 further comprising the step of determining whether the voice call is connected to the subscriber pursuant to the secondary hunting sequence and if such a connection is made, eliciting from the subscriber caller priority information to be stored in the database mapped to the identified source.

17. A method of connecting received calls having the same destination identifier associating said calls with a common subscriber to an appropriate one of one or more call options associated with the subscriber, said method comprising the steps of:

detecting a received call as either a voice or a data call;

if it is detected as a voice call, routing said call to a voice call decoder to connect the call to a selected one of one or more voice call options associated with the subscriber pursuant to an executed voice call selection routine; and if it is detected as a data call, routing said call to a data call decoder to connect the call to a selected one of one or more data call options associated with the subscriber pursuant to an executed data call selection routine.

18. The method of claim 17 further comprising identifying the source of the received call and if available, retrieving from a caller database caller priority information associated with the identified call source, said caller priority information having been at least partially defined by the subscriber, wherein the call is connected to the selected one of the one or more call options based on the retrieved caller priority information.

19. The method of claim 18 wherein the step of connecting the call to a selected one of the one or more call options includes connecting the call to one or more selected voice call options pursuant to a primary hunting sequence if the call is detected as a voice call and if the retrieved caller priority information indicates a relatively high priority.

20. The method of claim 19 wherein the step of connecting the call to a selected one of the one or more call options includes discarding the call if the retrieved caller priority information indicates a relatively low priority.

* * * * *